US012170039B2

(12) United States Patent
Oh et al.

(10) Patent No.: US 12,170,039 B2
(45) Date of Patent: Dec. 17, 2024

(54) DISPLAY DEVICE

(71) Applicant: Samsung Display Co., LTD., Yongin-si (KR)

(72) Inventors: Choonghee Oh, Hwaseong-si (KR); Tae Hoon Kwon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/095,963

(22) Filed: Jan. 11, 2023

(65) Prior Publication Data

US 2023/0245605 A1 Aug. 3, 2023

(30) Foreign Application Priority Data

Jan. 18, 2022 (KR) ........................ 10-2022-0007262

(51) Int. Cl.
*G09G 3/00* (2006.01)

(52) U.S. Cl.
CPC ............. *G09G 3/006* (2013.01); *G09G 3/035* (2020.08); *G09G 2300/0426* (2013.01); *G09G 2300/0452* (2013.01); *G09G 2310/0202* (2013.01); *G09G 2330/12* (2013.01); *G09G 2360/16* (2013.01)

(58) Field of Classification Search
CPC ................... G09G 3/006; G09G 3/035; G09G 2300/0426; G09G 2300/0452; G09G 2310/0202; G09G 2330/12; G09G 2360/16; G09G 3/34; G09G 2380/02; H01L 22/32; H01L 22/12; G02F 1/13; G02F 1/1309; G09F 9/35; H10K 71/70; H10K 2102/311
See application file for complete search history.

(56) References Cited

U.S. PATENT DOCUMENTS

| | | | | |
|---|---|---|---|---|
| 10,210,782 | B2 | 2/2019 | Lee et al. | |
| 2016/0275910 | A1* | 9/2016 | Lee | G09G 3/3225 |
| 2018/0158741 | A1* | 6/2018 | Kim | H01L 22/32 |
| 2018/0158894 | A1* | 6/2018 | Park | H10K 71/70 |

FOREIGN PATENT DOCUMENTS

| | | | |
|---|---|---|---|
| KR | 10-2018-0064596 | A | 6/2018 |
| KR | 10-2020-0051099 | A | 5/2020 |
| KR | 10-2020-0075410 | A | 6/2020 |

* cited by examiner

*Primary Examiner* — Patrick N Edouard
*Assistant Examiner* — Joseph P Fox
(74) *Attorney, Agent, or Firm* — Lewis Roca Rothgerber Christie LLP

(57) ABSTRACT

A display device includes: a display area including a plurality of pixels arranged to have a non-uniform horizontal resolution in a first direction; a peripheral area extending around the display area; a circuit area at a side of the peripheral area; a first main crack detection line in the peripheral area and extending along a first edge of the peripheral area; a first switching element in the circuit area and connected to a first end of the first main crack detection line; and a first data line connected to the first switching element and extending in a second direction that is different from the first direction through the display area. Twice a distance between the first data line and a center of the display area is equal to or greater than a length of the first data line in the second direction.

14 Claims, 7 Drawing Sheets

DISPLAY DEVICE

CROSS-REFERENCE TO RELATED APPLICATION

This application claims priority to and benefit of Korean Patent Application No. 10-2022-0007262, filed in the Korean Intellectual Property Office on Jan. 18, 2022, the entire content of which is incorporated herein by reference.

BACKGROUND

1. Field

Aspects of embodiments of the present disclosure relate to a display device.

2. Description of the Related Art

A display device, such as a liquid crystal display (LCD) or an organic light emitting diode (OLED) display, includes a display panel including a plurality of pixels configured to display an image and a plurality of signal lines. Each pixel may include a pixel electrode for receiving a data signal, and the pixel electrode may be connected to at least one transistor to receive the data signal. The display panel may include a plurality of stacked layers.

When a display panel is impacted (e.g., by an object), cracks may be formed on a substrate or on the layers stacked thereon during a manufacturing process of the display panel. The cracks may grow over time and may spread to other layers or other regions, which can lead to poor display panel quality. For example, a signal line, such as a data line or a scan line, may be disconnected due to the cracks or may increase in resistance, and moisture may penetrate into the display panel through the cracks, thereby reducing element reliability. As a result, various problems, such as pixels of the display panel not emitting light, erroneously emitting light, and the like, may occur.

Recently developed flexible displays may be curved or bent during manufacture or use, and when even minute cracks are present in the substrate or stacked layers of the flexible display panel, the minute cracks may develop into larger cracks due to curving or bending of the display panel.

The above information disclosed in this Background section is for enhancement of understanding of the background of the present disclosure, and therefore, it may contain information that does not form the prior art that is already known to a person of ordinary skill in the art.

SUMMARY

A display device, according to embodiments of the present disclosure, exhibits increased accuracy of detecting defects, such as cracks that may occur in a display panel having non-uniform horizontal resolution.

An embodiment of the present disclosure provides a display device including: a display area including a plurality of pixels arranged to have a non-uniform horizontal resolution in a first direction; a peripheral area extending around the display area; a circuit area at a side of the peripheral area; a first main crack detection line in the peripheral area and extending along a first edge of the peripheral area; a first switching element in the circuit area and connected to a first end of the first main crack detection line; and a first data line connected to the first switching element and extending in a second direction that is different from the first direction through the display area. Twice a distance between the first data line and a center of the display area is equal to or greater than a length of the first data line in the second direction.

The display device may further include a plurality of first data lines, and twice a distance between an outermost one of the first data lines that is furthest from the center of the display area and the center of the display area may be equal to or greater than a length of the outermost one of the first data lines in the second direction.

The display device may further include: a first matching resistor connected to a second end of the first main crack detection line; a second switching element in the circuit area and connected to the first matching resistor; and a second data line connected to the second switching element and extending in the second direction through the display area.

A minimum value of the first matching resistor may be inversely proportional to a lowest horizontal resolution of a pixel row from among pixel rows of the display area connected through the first data line.

The first matching resistor may be determined by the following equation, $$\frac{Rm*N}{RES}*(1+DIV)\leq R1\leq Ra,$$

wherein R1 is a resistance of the first matching resistor, Rm is a resistance of the first main crack detection line, N is a number of first data lines connected to the first main crack detection line, RES is the horizontal resolution of the pixel row having the lowest horizontal resolution from among the pixel rows of the display area connected through the first data line, DIV is an allowable distribution between a voltage drop across the first main crack detection line and a voltage drop across the first matching resistor, and Ra is a maximum value of the first matching resistor.

A maximum value of the first matching resistor may be determined so that a gray displayed by a second pixel connected to the second switching element is not lower than a gray displayed by a first pixel connected to the first switching element from among the pixels when the first main crack detection line is in a normal state.

The display device may further include: a second main crack detection line in the peripheral area and extending along a second edge of the peripheral area facing the first edge; a third switching element in the circuit area and connected to a first end of the second main crack detection line; and a third data line connected to the third switching element and extending in the second direction through the display area. A distance between the first data line and the third data line may be equal to or greater than a length of the first data line in the second direction.

The display device may further include a plurality of first data lines and a plurality of third data lines, and a distance between an outermost one of the first data lines that is furthest from the center of the display area and an outermost one of the third data lines that is furthest from the center of the display area may be equal to or greater than a length of the outermost one of the first data lines in the second direction.

The display device may further include: a bending area at a side of the peripheral area; a bending crack detection line passing through the bending area; a fourth switching element in the circuit area and connected to a first end of the bending crack detection line; and a fourth data line connected to the fourth switching element and extending in the second direction through the display area.

The first data line and the fourth data line may be at a same side with respect to the center of the display area, and a distance between the center of the display area and the first data line may be greater than a distance between the center of the display area and the fourth data line.

The display device may further include a plurality of first data lines and a plurality of fourth data lines, and a distance between an outermost one of the first data lines that is furthest from the center of the display area and the center of the display area may be greater than a distance between an outermost one of the fourth data lines that is furthest from the center of the display area and the center of the display area.

A color indicated by a pixel connected to the first data line from among the pixels may be different from a color indicated by a pixel connected to the fourth data line from among the pixels.

A flat shape of the display area may be any one of a circle, an ellipse, and a quadrangle, and when the flat shape of the display area is the quadrangle, a diagonal of the quadrangle may be parallel to the first direction or the second direction in the quadrangular display area.

According to another embodiment, a display device includes: a display area including a plurality of pixels arranged to have a non-uniform horizontal resolution in a first direction; a peripheral area extending around the display area; a circuit area at a side of the peripheral area; a first main crack detection line in the peripheral area and extending along a first edge of the peripheral area; a first switching element in the circuit area and connected to a first end of the first main crack detection line; a first data line connected to the first switching element and extending in a second direction that is different from the first direction through the display area; a first matching resistor connected to a second end of the first main crack detection line; a second switching element in the circuit area and connected to the first matching resistor; and a second data line connected to the second switching element and extending in the second direction through the display area. A minimum value of the first matching resistor is inversely proportional to a lowest horizontal resolution of a pixel row from among pixel rows of the display area connected through the first data line.

The first matching resistor may be determined by a following equation, $$\frac{Rm*N}{RES}*(1+DIV)\leq R1\leq Ra,$$

wherein R1 is a resistance of the first matching resistor, Rm is a resistance of the first main crack detection line, N is a number of first data lines connected to the first main crack detection line, RES is the horizontal resolution of the pixel row having the lowest horizontal resolution from among the pixel rows of the display area connected through the first data line, DIV is an allowable distribution between a voltage drop across the first main crack detection line and a voltage drop across the first matching resistor, and Ra is a maximum value of the first matching resistor.

A a maximum value of the first matching resistor may be determined so that a gray displayed by a second pixel connected to the second switching element is not lower than a gray displayed by a first pixel connected to the first switching element from among the pixels when the first main crack detection line is in a normal state.

According to another embodiment, a display device includes: a display area including a plurality of pixels arranged to have a non-uniform horizontal resolution in a first direction; a peripheral area extending around the display area; a circuit area at a side of the peripheral area; a first main crack detection line in the peripheral area and extending along a first edge of the peripheral area; a first switching element in the circuit area and connected to a first end of the first main crack detection line; a first data line connected to the first switching element and extending in a second direction that is different from the first direction through the display area; a bending area at a side of the peripheral area; a bending crack detection line passing through the bending area; a second switching element in the circuit area and connected to a first end of the bending crack detection line; and a second data line connected to the second switching element and extending in the second direction through the display area. The first data line and the second data line are at a same side of the display area with respect to the center of the display area, and a distance between the center of the display area and the first data line is greater than a distance between the center of the display area and the second data line.

The display device may further include a plurality of first data lines and a plurality of second data lines, and a distance between an outermost one of the first data lines that is furthest from the center of the display area and the center of the display area may be greater than a distance between an outermost one of the second data lines that is furthest from the center of the display area and the center of the display area.

A color indicated by a pixel connected to the first data line from among the pixels may be different from a color indicated by a pixel connected to the second data line from among the pixels.

A flat shape of the display area ay be any one of a circle, an ellipse, and a quadrangle, and when the flat shape of the display area is the quadrangle, a diagonal of the quadrangle may be parallel to the first direction or the second direction in the quadrangular display area.

According to embodiments of the present disclosure, accuracy of detecting defects, such as cracks that may occur in a display panel having non-uniform horizontal resolution, is increased.

DETAILED DESCRIPTION

Figure 1:
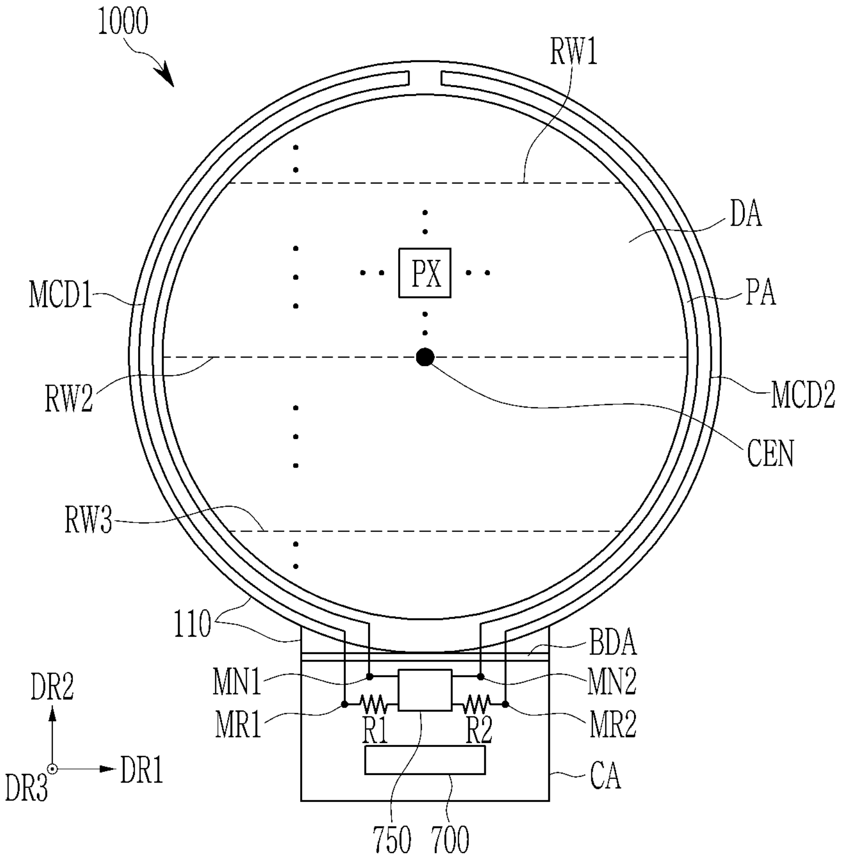
FIG. 1 is a top plan view of a display panel included in a display device according to an embodiment.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

To more clearly describe the present disclosure, aspects, features, and parts that are irrelevant to the description or are well-known to those of ordinary skill in the relevant art may be omitted. Like numerals refer to like or similar constituent elements throughout the specification.

Further, sizes and thicknesses of constituent members shown in the accompanying drawings may be arbitrary for better understanding and ease of description; therefore, the present disclosure is not limited to the illustrated sizes and thicknesses.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

Further, throughout the specification, the phrase "in a plan view" indicates an object portion viewed from above, for example, in the present specification, when viewed in a direction that is perpendicular to a first direction DR1 and a second direction DR2. The phrase "in a cross-sectional view" indicates a cross-section taken by vertically cutting an object portion and viewed from the side, for example, in the present specification, when cut in the direction that is perpendicular to the first direction DR1 and the second direction DR2.

A display device according to embodiments of the present disclosure will now be described with reference to FIG. 1 to FIG. 4.

Figure 2:
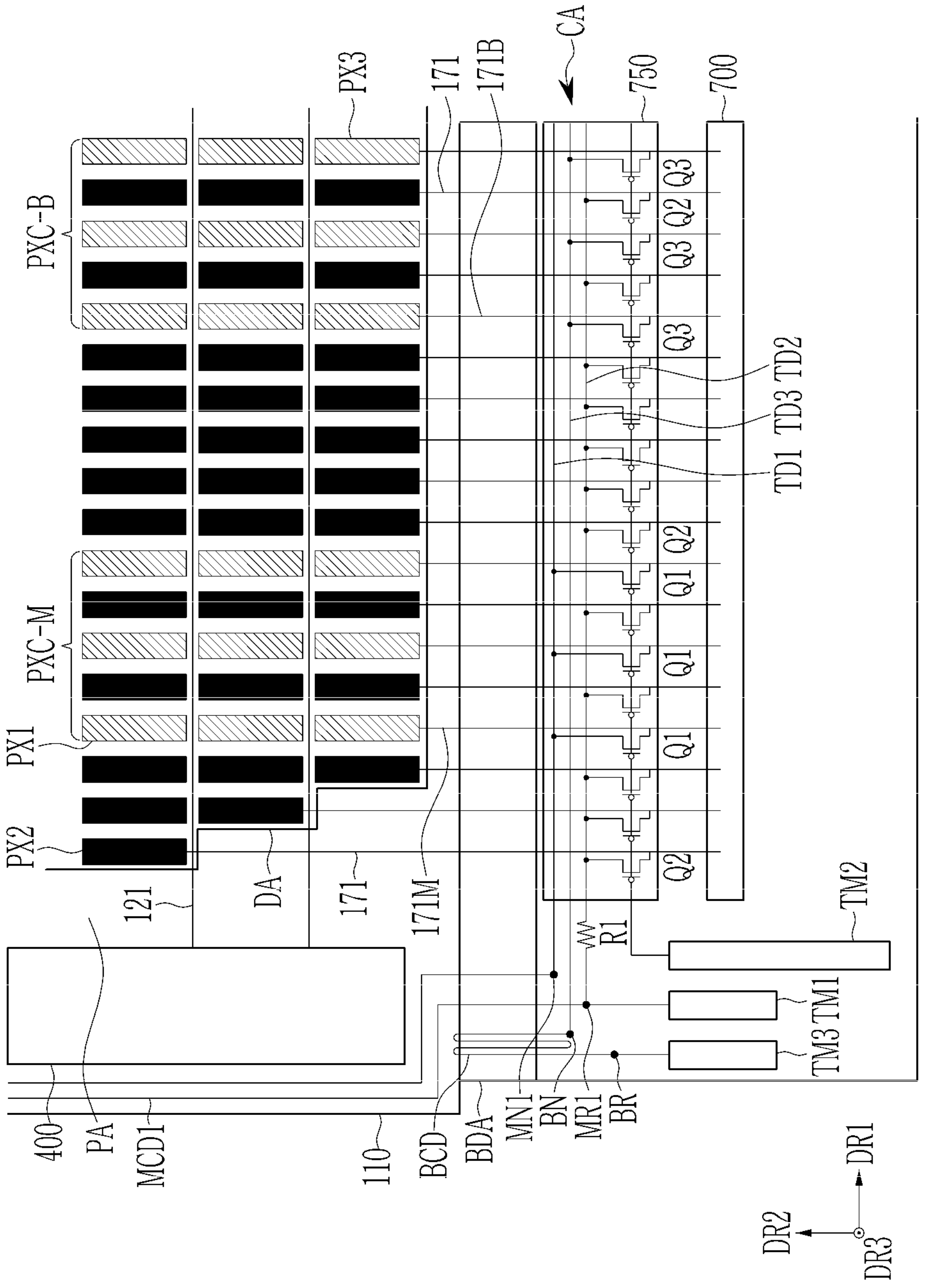
FIG. 2 is a top plan view showing some regions of a display panel according to an embodiment.
Figure 3:
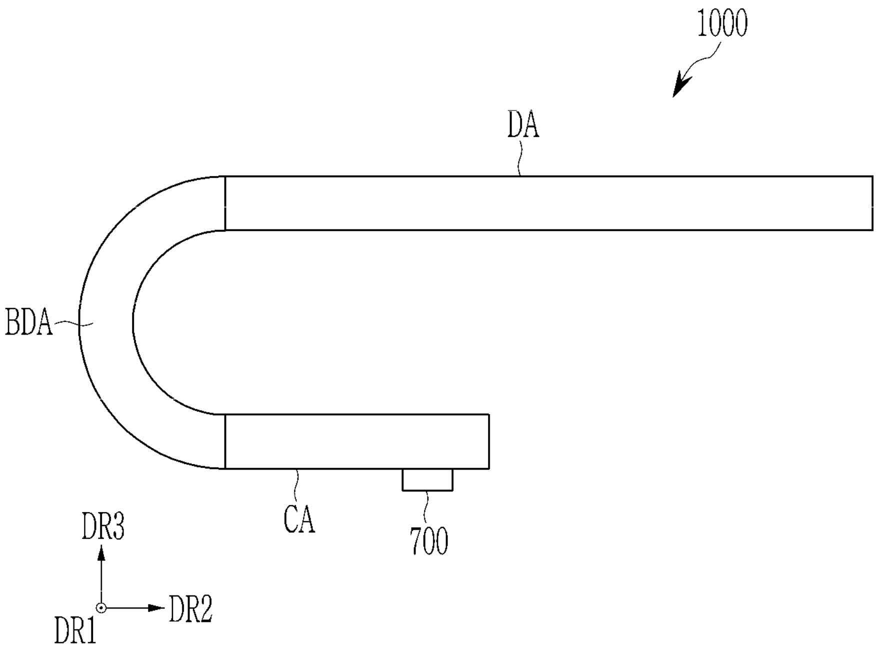
FIG. 3 illustrates a display panel in a bent state according to an embodiment.
Figure 4:
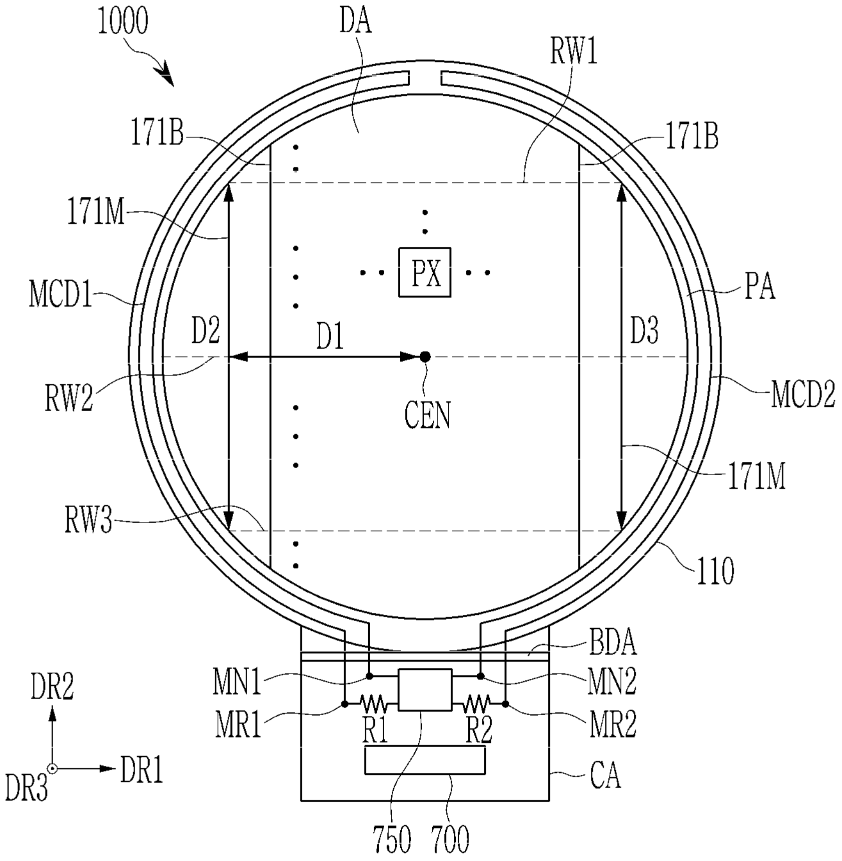
FIG. 4 is a top plan view of a display panel included in a display device according to an embodiment.

FIG. 1 is a top plan view of a display panel included in a display device according to an embodiment, FIG. 2 is a top plan view showing some regions of a display panel according to an embodiment, FIG. 3 illustrates a display panel in a bent state according to an embodiment, and FIG. 4 is a top plan view of a display panel included in a display device according to an embodiment. FIG. 2 illustrates a left-side portion of the display panel illustrated in FIG. 1, and a right-side portion of the display panel may have a same structure as shown in FIG. 2.

Referring to FIG. 1 to FIG. 3, the display device according to an embodiment includes a display panel 1000 having a display area DA, which is an area configured to display an image, and a non-display area, which is an area excluding (e.g., other than) the display area DA.

The display area DA may display an image on a surface that is parallel to the first direction DR1 and the second direction DR2. The display area DA includes a plurality of pixels PX as a unit for displaying an image and a plurality of signal lines.

The pixels PX each may include at least one transistor and a pixel electrode connected thereto. For example, when the pixel PX includes at least one light-emitting device, each pixel PX may include at least one transistor connected to the light-emitting device. To implement a color display, each pixel PX may display one of a few specific colors, and an image having a desired color may be recognized as a sum of the colors displayed by the various pixels PX. Examples of the specific colors displayed by the pixels PX include the three primary colors of red, green, and blue and may further include another color, such as white, in addition to these three primary colors.

The signal lines include a plurality of scan lines 121 for transferring scan signals and a plurality of data lines 171 for transferring data signals. Each of the scan lines 121 may primarily extend in the first direction DR1 in (or across) the display area DA and may be connected to a scan driver 400. The data lines 171 may extend primarily in the second direction DR2 in (or across) the display area DA toward the non-display area to be connected to a data driver 700.

Horizontal resolution, which is the number of pixels PX in the first direction DR1 in the display area DA, may vary depending on a position thereof. FIG. 1 illustrates an example in which the display area DA is approximately circular, and thus, the horizontal resolution of the display area DA may be highest at a point passing through a center CEN of the display area DA and may progressively decrease away from the center CEN. For example, the horizontal resolution of a central pixel row RW2 passing through the center CEN of the display area DA is highest, and based on this, the horizontal resolution of an upper pixel row RW1 or a lower pixel row RW3 may be lower than that of the pixel row RW2 passing through the center CEN. When a pitch of the pixels PX (e.g., the pixel pitch) is constant in the display area DA, the central pixel row RW2 may have a longest length, and a length of the upper pixel row RW1 and the lower pixel row RW3 may be smaller than that of the central pixel row RW2.

Approximately three times the pitch of the pixels PX arranged in the display area DA in the first direction DR1 may be equal to the pitch of the pixels PX in the second direction DR2, but the present disclosure is not limited thereto.

The non-display area may include a peripheral area PA positioned (or extending) around the display area DA, a bending area BDA, and a circuit area CA.

The peripheral area PA may be adjacent to the display area DA and may be an area surrounding (e.g., extending around a periphery of) the display area DA. The peripheral area PA may include a scan driver 400, one or more main crack detection lines MCD1 and MCD2, etc.

The scan driver 400 may be connected to the scan lines 121 to apply scan signals thereto. The scan driver 400 may be formed on a substrate 110 together with a plurality of signal lines and transistors positioned in the display area DA. FIG. 2 illustrates only a left side of the display panel 1000 and, accordingly, shows only the scan driver 400 on a left side of the display area DA. In some embodiments, scan drivers may be positioned at both left and right sides of the display area DA. The scan driver 400 may include a plurality of stages arranged along an edge of the display area DA. The stages may respectively transfer scan signals to corresponding scan lines 121.

Each of the main crack detection lines MCD1 and MCD2 has a first end MN1 and MN2 and an opposite second end MR1 and MR2 and extends along an edge of the display area DA between the first end MN1 and MN2 and the second end MR1 and MR2. For example, the main crack detection line MCD1, at the left side of the display area DA, may start from the first end MN1 to extend along an edge of a left half of the display area DA in the peripheral area PA at the left side of the display area DA and may make one or more round trips to return to the second end MR1. Similarly, the main crack detection line MCD2, at the right side of the display area DA, may start from the first end MN2 to extend along an edge of a right half of the display area DA in the peripheral area PA at the right side of the display area DA and may make one or more round trips to return to the second end MR2. In the peripheral area PA above the display area DA, a bent portion of the left main crack detection line MCD1 and a bent portion of the right main crack detection line MCD2 may face each other while being spaced apart from each other.

According to an embodiment, one of the main crack detection line MCD1, at the left side, and the main crack detection line MCD2, at the right side, may be omitted, and in such an embodiment, the remaining crack detection line may extend along edges of entire right half and left half of the display area DA.

The bending area BDA may be positioned below the peripheral area PA positioned under the lower side of the display area DA and may extend across the display panel 1000 in the first direction DR1.

When a cross-sectional position of a conductive layer positioned in the bending area BDA and a cross-sectional position of the main crack detection lines MCD1 and MCD2 positioned in the peripheral area PA are not the same, the main crack detection lines MCD1 and MCD2 may each include at least one contact portion positioned around upper and lower sides of the bending area BDA. The main crack detection lines MCD1 and MCD2 may include portions positioned on different layers in a cross-section with respect to the contact portion. The contact portion may include at least one contact hole (or contact opening).

Referring to FIG. 3, the display panel 1000 may be bent at the bending area BDA so that the circuit area CA positioned outside the bending area BDA is folded toward back of the display area DA of the display panel 1000. FIG. 1 and FIG. 2 each illustrate a state in which the display panel 1000 is unfolded without being bent at the bending area BDA, and FIG. 3 schematically illustrates a state in which the display panel 1000 is bent at the bending area BDA. A plurality of wires may pass through the bending area BDA and may extend in the second direction DR2 via the bending area BDA.

In some embodiments, the bending area BDA may be omitted depending on a structure of the display device.

Referring to FIG. 1 and FIG. 2, the circuit area CA may be positioned under a first side of the display area DA or the peripheral area PA and may be positioned under the bending area BDA (e.g., at an opposite side of the bending area BDA with respect to the display area DA). According to another embodiment, the circuit area CA may be positioned between the bending area BDA and the display area DA.

A circuit portion 750, a plurality of pads TM1, TM2, and TM3, and a data driver 700 may be positioned in the circuit area CA.

A first end MN1 and MN2 and a second end MR1 and MR2 of each of the main crack detection lines MCD1 and MCD2 may be positioned in the circuit area CA. Accordingly, each of the main crack detection lines MCD1 and MCD2 may start from the first end MN1 and MN2, may pass through the bending area BDA, may extend along the peripheral area PA, and may return to the second end MR1 and MR2 through the bending area BDA after reciprocating and bending. The first end MN1 and MN2 and the second end MR1 and MR2 of each of the main crack detection lines MCD1 and MCD2 may be connected to the circuit portion 750 in the circuit area CA.

According to an embodiment, the first end MN1 and MN2 and the second end MR1 and MR2 of each of the main crack detection lines MCD1 and MCD2 may be positioned in the peripheral area PA between the bending area BDA and the display area DA. In such an embodiment, the circuit portion 750 may also be positioned in the peripheral area PA between the bending area BDA and the display area DA.

The circuit portion 750 includes a crack detection circuit configured to detect defects, such as cracks and lifting, occurring in the substrate 110 or layers stacked on the substrate 110 of the display panel 1000 through resistance changes in the main crack detection lines MCD1 and MCD2. The changes in the resistance of the main crack detection lines MCD1 and MCD2 may be checked (or determined) by examining a lighting state of the display area DA through the crack detection circuit. The circuit portion 750 includes a plurality of electric elements, such as switching elements (e.g., transistors) Q1, Q2, and Q3, and the electric elements, such as these transistors, may be formed on the same substrate 110 together with a plurality of signal lines and transistors positioned in the display area DA. A specific structure of the circuit portion 750 will be described in more detail later.

The pads TM1, TM2, and TM3 may be electrically connected to the main crack detection lines MCD1 and MCD2 and the circuit portion 750. For example, the second end MR1 of each main crack detection line MCD1 may be connected to the pad TM1 to receive an inspection voltage. The second end MR1 of each main crack detection line MCD1 may be directly connected to the pad TM1 through a wire. The pad TM2 may apply a gate signal to gates (e.g, gate electrodes) of the switching elements Q1, Q2, and Q3 of the circuit portion 750.

The data driver 700 may generate a driving signal for driving the display panel 1000. The data lines 171 may be connected to the data driver 700 to receive a data signal.

Referring to FIG. 2, the display panel 1000, according to an embodiment, may further include a bending crack detection line BCD. The bending crack detection line BCD is for detecting whether or not defects, such as cracks, occur in the bending area BDA and may be limited in position to in and around the bending area BDA. FIG. 2 illustrates only the bending crack detection line BCD positioned at a left side of the bending area BDA, but the display panel 1000 may also include a bending crack detection line positioned on a right side of the bending area BDA.

The bending crack detection line BCD is positioned at left and/or right edges of the bending area BDA and has a first end BN and a second end BR. The bending crack detection line BCD may start at the first end BN and extend approximately in the second direction DR2 to reciprocate at least once around (e.g., across and back) the bending area BDA, or may reciprocate one or more times around a perimeter of the bending area BDA and return after forming a bend portion and end at the second end BR. The first end BN may be connected to the circuit portion 750, and the second end BR may be connected to the pad TM3 to receive an inspection voltage.

According to an embodiment, a separate circuit portion to which the bending crack detection line BCD is connected may be provided and positioned separately from the circuit portion 750.

The bending crack detection line BCD positioned at a left side in the bending area BDA is located between the main crack detection line MCD1 and a left edge of the substrate 110, and the bending crack detection line positioned at a right side may be positioned between the main crack detection line MCD2 and a right edge of the substrate 110. However, a positional relationship between the bending crack detection line BCD and the main crack detection lines MCD1 and MCD2 within the bending area BDA is not limited thereto, and positions of the bending crack detection lines BCD and the main crack detection lines MCD1 and MCD2 may be varied.

The circuit portion 750 will be described in more detail with reference to FIG. 1 and FIG. 2.

A first end MN1 of each of the main crack detection lines MCD1 and MCD2 is connected to an inspection line TD1, and a second end MR1 is connected to the pad TM1 and also connected to an inspection line TD2 through matching resistors R1 and R2.

Two inspection lines TD1, to which the main crack detection lines MCD1 and MCD2 positioned at left and right sides of the display panel 1000 are respectively connected, may be spaced apart from each other in the first direction DR1 to not be electrically connected to each other (e.g., to be electrically isolated from each other). In addition, the two inspection lines TD2 respectively connected to the main crack detection lines MCD1 and MCD2 positioned at the left and right sides of the display panel 1000 may be spaced apart from each other in the first direction DR1 to not be electrically connected to each other. Each of the inspection lines TD1 and TD2 may primarily extend in the first direction DR1 and may be insulated from and cross the data line 171.

The circuit portion 750 may include the switching elements Q1, Q2, and Q3 including a gate (e.g., a gate electrode) connected to the pad TM2. The switching elements Q1, Q2, and Q3 are arranged in one or more rows in the circuit portion 750. FIG. 2 illustrates an embodiment in which the plurality of switching elements Q1, Q2, and Q3 form one row, but the present disclosure is not limited thereto. Each of the switching elements Q1, Q2, and Q3 may be positioned to correspond to one corresponding data line 171 and may have an output electrode connected to the corresponding data line 171.

The switching elements Q1, Q2, and Q3 include a first switching element Q1 having an input terminal connected to the inspection line TD1 and an output electrode connected to one or more first data lines 171M, and a second switching element Q2 having an input terminal connected to the inspection line TD2 and an output electrode connected to one or more data lines 171.

The one or more first data lines 171M to which the first switching element Q1 is connected may be connected to a column of one or more first pixels PX1 representing a first color from among the pixels PX. A column of one or more first pixels PX1 positioned in succession in the first direction DR1, except for pixels representing different colors in the middle, and connected to the first switching element Q1, is referred to as a first pixel column group PXC-M. A number of first data lines 171M included in one first pixel column group PXC-M may be one or more. FIG. 2 illustrates an embodiment in which the number of first data lines 171M included in one first pixel column group PXC-M is three.

A column of the first pixel PX1 may include, for example green pixels.

The one or more data lines 171 to which the second switching element Q2 is connected may be connected to a column of one or more second pixels PX2 representing a second color from among the pixels PX. A column of the second pixel PX2 may include pixels representing one or more colors. For example, the second pixel PX2 may include pixels representing (or emitting) red and blue. The column of the second pixel PX2 may include a pixel column positioned between columns of the first pixels PX1 of the first pixel column group PXC-M, and pixel columns positioned outside the first pixel column group PXC-M and adjacent to the first pixel column group PXC-M. According to an embodiment, the second switching element Q2 may be connected to most of the pixel columns other than the first pixel column group PXC-M, to which the first switching element Q1 is connected.

The first end BN of each bending crack detection line BCD is connected to the inspection line TD3, and the second end BR is connected to the pad TM3.

Two inspection lines TD3 to which the bending crack detection lines BCD positioned at left and right sides of the display panel 1000 are respectively connected may be spaced apart from each other in the first direction DR1 to not be electrically connected to each other. Each of the inspection lines TD3 may primarily extend in the first direction DR1 and may be insulated from and cross the data line 171.

The switching elements Q1, Q2, and Q3 may further include a third switching element Q3 having an input terminal connected to the inspection line TD3 and an output electrode connected to one or more second data lines 171B.

The one or more second data lines 171B to which the third switching element Q3 is connected may be connected to a column of one or more third pixels PX3 representing a third color from among the pixels PX. A column of one or more third pixels PX3 positioned in succession in the first direction DR1, except for pixels representing different colors in the middle, and connected to the third switching element Q3, is referred to as a second pixel column group PXC-B. A number of second data lines 171B included in second pixel column group PXC-B may be one or more. FIG. 2 illustrates an embodiment in which the number of second data lines 171B included in one second pixel column group PXC-B is three.

The column of the third pixel PX3 may include pixels representing the same color as the column of the first pixel PX1 or pixels representing a different color. For example, the column of third pixel PX3 may include pixels representing (or emitting) green.

The column of the second pixel PX2 may include a pixel column positioned between columns of the first pixels PX1 of the first pixel column group PXC-M, a pixel column positioned between columns of the third pixels PX3 of the second pixel column group PXC-B, and pixel columns positioned outside the first pixel column group PXC-M and the second pixel column group PXC-B and adjacent to the first pixel column group PXC-M and the second pixel column group PXC-B. According to an embodiment, the second switching element Q2 may be connected to most of the pixel columns other than the first pixel column group PXC-M and the second pixel column group PXC-B.

A plurality of second pixel columns PX2 are positioned between the first pixel column group PXC-M and the second pixel column group PXC-B positioned at one of left and right sides of the display panel 1000.

According to an embodiment, disposal (e.g., arrangement) of the switching elements Q1, Q2, and Q3 may be variously changed.

Referring to FIG. 4, a distance D1 between the first data line 171M electrically connected to a first end of the main crack detection lines MCD1 and MCD2 and the center CEN of the display area DA may be greater than a distance between the second data line 171B electrically connected to the bending crack detection line BCD at a same side and the center CEN of the display area DA. For example, when the main crack detection lines MCD1 and MCD2 and the bending crack detection line BCD are positioned at the left and right sides of the display area DA, respectively, a distance in the first direction DR1 between the left and right first data lines 171M electrically connected to both main crack detection lines MCD1 and MCD2, respectively, may be greater than a distance in the first direction DR1 between the left and right second data lines 171B electrically connected to both bending crack detection lines BCD, respectively. Herein, when each first pixel column group PXC-M is connected to the first data lines 171M, a distance in the first direction DR1 between the left and right first data lines 171M based on the center CEN of the display area DA may be a maximum distance between two first data lines 171M positioned at outermost sides. In addition, when each second pixel column group PXC-B is connected to the second data lines 171B, a distance in the first direction DR1 between the left and right second data lines 171B based on the center CEN of the display area DA may be a maximum distance between two second data lines 171B positioned at outermost sides.

In FIG. 4, the upper pixel row RW1 may cross (e.g., may pass through) upper ends of the left and right first data lines 171M positioned at the outermost sides with respect to the center CEN of the display area DA. In FIG. 4, the lower pixel row RW3 may cross (e.g., may pass through) lower ends of the left and right first data lines 171M positioned at the outermost sides with respect to the center CEN of the display area DA. In such an embodiment, each of a length of the upper pixel row RW1 in the first direction DR1 and a length of the lower pixel row RW3 in the first direction DR1 may be approximately twice the distance D1 between the outermost first data line 171M and the center CEN of the display area DA.

A method of inspecting defects, such as cracks, in a display device according to an embodiment will now be described with reference to FIG. 1 to FIG. 4.

An inspection voltage is applied to the main crack detection lines MCD1 and MCD2 and the bending crack detection line BCD through the pads TM1 and TM3, and a gate-on voltage is applied through the pad TM2. Then, the switching elements Q1, Q2, and Q3 of the circuit portion 750 are turned on, and an inspection voltage is applied to the data lines 171, including the first data line 171M and the second data line 171B, through the switching elements Q1, Q2, and Q3. The inspection voltage, which is a reference (e.g., predetermined) voltage, may be, for example, a voltage that causes the pixel PX to display a lowest (or darkest) gray, such as black.

To inspect defects, such as cracks, occurring in the display panel 1000 other than at the bending area BDA, the inspection voltage applied through the pad TM1 may be transferred to the main crack detection lines MCD1 and MCD2 to apply a voltage reduced by a first voltage difference by wiring resistance of the main crack detection lines MCD1 and MCD2 to the input terminal of the first switching element Q1 through the inspection line TD1 and may also be reduced by a second voltage difference through the matching resistors R1 and R2 and then applied to the input terminal of the second switching element Q2.

Resistances of the matching resistors R1 and R2 may be determined such that a difference between a first voltage difference and a second voltage difference is within a reference (e.g., a predetermined) distribution when the main crack detection lines MCD1 and MCD2 are in normal condition without damage, such as cracks or lifting. Herein, the reference distribution may be in a range of approximately 10% to approximately 20%, but the present disclosure is not limited thereto.

When the main crack detection lines MCD1 and MCD2 are in a normal condition without damage because cracks, lifting, etc. have not occurred in the peripheral area PA of the display panel 1000, a column of the first pixel PX1 connected to the first switching element Q1 may display a lowest gray, such as black, like the column of pixels connected to the second switching element Q2.

However, when damages, such as cracks, lifting, etc., occur in the peripheral area PA of the display panel 1000 to disconnect the main crack detection lines MCD1 and MCD2 or wiring resistance is increased due to damage, a sufficient black data voltage is not applied to the first pixel PX1 connected to the first switching element Q1 through the first data line 171M. Accordingly, a bright line may appear along the column of the first pixel PX1 connected to the first switching element Q1, that is, the first pixel column group PXC-M. Defects, such as cracks, occurring in the peripheral area PA of the display panel 1000 may be detected through the bright line displayed as described above.

In an embodiment in which the column of the first pixel PX1 connected to the first switching element Q1 to which the main crack detection lines MCD1 and MCD2 are connected includes only green pixels, a green bright line may appear when defects, such as cracks, occur in the peripheral area PA of the display panel 1000. As illustrated in FIG. 2, when defects, such as cracks, occur in the peripheral area PA positioned at a left side of the display area DA, a green bright line may appear in the first pixel column group PXC-M at the left including the column of the first pixel PX1 connected to the first switching element Q1 connected to the main crack detection line MCD1 positioned at the left because a resistance of the main crack detection line MCD1 is increased. Similarly, when defects, such as cracks, occur in the peripheral area PA positioned at a right side of the display area DA, a green bright line may appear in the first pixel column group PXC-M at the right including the column of the first pixel PX1 connected to the first switching element Q1 connected to the main crack detection line MCD2 because a resistance of the main crack detection line MCD2 is relatively increased.

Similarly, for inspection of defects, such as cracks, occurring in the bending area BDA, the inspection voltage applied through the pad TM3 may be transferred to the bending crack detection line BCD to apply a voltage that is reduced by the third voltage difference by the wiring resistance of the bending crack detection line BCD to the input terminal of the third switching element Q3 through the inspection line TD3.

When the bending crack detection line BCD is in a normal condition without damage because of cracks, lifting, etc. have not occurred in the bendable area BDA of the display panel 1000, a column of the third pixel PX3 connected to the third switching element Q3 may display a lowest gray, such as black, similar to the column of pixels connected to the second switching element Q2.

However, when cracks, lifting, etc. occur in the bendable BDA of the display panel 1000 to disconnect the bending crack detection lines BCD or the wiring resistance is increased due to damage, a sufficient black data voltage is not applied to the third pixel PX3 connected to the third switching element Q3 through the second data line 171B. Accordingly, a bright line may appear along the column of the third pixel PX3 connected to the third switching element Q3, that is, the second pixel column group PXC-B. Defects, such as cracks, occurring in the bendable area BDA of the display panel 1000 may be detected through the bright line displayed as described above.

In an embodiment in which the column of the third pixel PX3 connected to the third switching element Q3 to which the bending crack detection line BCD is connected includes only green pixels, a green bright line may appear when defects, such as cracks, occur in the peripheral area PA of the display panel 1000. As illustrated in FIG. 2, when defects, such as cracks, occur in the bendable area BDA positioned at a left side, a green bright line may appear in the second pixel column group PXC-B at the left including the column of the third pixel PX3 connected to the third switching element Q3 connected to the bending crack detection line BCD positioned at the left because a resistance of the bending crack detection line BCD is increased. Similarly, when defects, such as cracks, occur in the bendable area BDA positioned at a right side, a green bright line may appear in the second pixel column group at the right including the column of the third pixel PX3 connected to the third switching element Q3 connected to the bending crack detection line BCD because a resistance of the bending crack detection line BCD is relatively increased.

Resistances of the matching resistors R1 and R2 connected to the main crack detection lines MCD1 and MCD2 for inspecting the peripheral area PA of the display panel 1000 may be determined such that the second pixel PX2 connected to the second switching element Q2 may display a lowest gray, such as black. In addition, the resistances of the matching resistors R1 and R2 may be determined to not be lower than a gray displayed by the first pixel PX1 connected to the first switching element Q1 when the main crack detection lines MCD1 and MCD2 are in normal condition (e.g., without damage, such as cracks or lifting).

According to an embodiment, a minimum value of the matching resistor R1 may be inversely proportional to horizontal resolution of a pixel row having the lowest horizontal resolution from among pixel rows of the display area DA connected through the first data line 171M. For example, a value of the matching resistor R1 according to an embodiment may be determined by the following [Equation 1].

$$\frac{Rm*N}{RES}*(1+DIV)\leq R1\leq Ra \qquad \text{Equation 1}$$

In [Equation 1], each symbol is as follows.

R1: Resistance of one matching resistor R1.

Rm: Resistance of the main crack detection line MCD1 connected to the matching resistor R1.

N: Number of first data lines 171M included in the first pixel column group PXC-M connected to the main crack detection line MCD1.

RES: Horizontal resolution of a pixel row having the lowest horizontal resolution from among pixel rows of the display area DA connected through the first data line 171M. In the embodiment illustrated in FIG. 4, when the horizontal resolution decreases toward the edge of the display area DA, RES may be the horizontal resolution of the pixel PX between the first data line 171M electrically connected to the main crack detection line MCD1 at a side based on the center CEN of the display area DA and the center CEN of the display area DA or may be half of the horizontal resolution of the pixel PX between the first data lines 171M to which the two main crack detection lines MCD1 and MCD2 are respectively connected.

DIV: Allowable distribution between a voltage drop across the main crack detection line MCD1 and a voltage drop across the matching resistor R1.

Ra: Maximum value of the matching resistor R1 that can normally detect cracks in the display panel.

As described above, the maximum value Ra of the matching resistor may be determined so that a gray displayed by the second pixel PX2 connected to the second switching element Q2 is not be lower than a gray displayed by the first pixel PX1 connected to the first switching element Q1 when the main crack detection lines MCD1 and MCD2 are in normal condition (e.g., without damage, such as cracks or lifting).

A value of the matching resistor R2 connected to the main crack detection line MCD2 may also be determined by [Equation 1] above. In this case, in [Equation 1], a resistance of the matching resistor R2 may be used instead of R1, Rm may be a resistance of the main crack detection line MCD2 connected to the matching resistor R2, N may be a number of first data lines 171M included in the first pixel column group PXC-M connected to the main crack detection line MCD2, RES may be resolution of the pixel PX between the first data line 171M electrically connected to the main crack detection line MCD2 at a side based on the center CEN of the display area DA and the center CEN of the display area DA or may be a half of the resolution of the pixel PX between the first data line 171M to which the two main crack detection lines MCD1 and MCD2 are respectively connected, DIV may be a distribution between a voltage drop through the main crack detection line MCD2 and a voltage drop through the matching resistor R2, and Ra may be a maximum value of the matching resistor R2 capable of normally detecting cracks of the display panel.

In a display device in which horizontal resolution of the display area DA of the display device varies (e.g., is not constant between the different horizontal lines), a voltage drop amount of a driving voltage may vary for each pixel row having different horizontal resolutions. When a criterion for setting the matching resistors R1 and R2 is a pixel row having a larger horizontal resolution from among different horizontal resolutions, that is, when "RES" is set to a different horizontal resolution in [Equation 1] above, for example, a second pixel PX2 belonging to a pixel row having a relatively low horizontal resolution from among pixels in a column of the second pixel PX2 connected to the matching resistors R1 and R2 may experience a relatively low voltage drop of the driving voltage applied to the second pixel PX2, and thus, luminance of the corresponding second pixel PX2 may decrease. Then, luminance of the first pixel PX1 positioned around the second pixel PX2 with the decreased luminance may be visually recognized as being relatively high, and accuracy of the crack inspection may be deteriorated.

However, according to the present embodiment, the horizontal resolution RES at which the minimum value of the matching resistors R1 and R2 is determined based on the horizontal resolution RES, which is referred to in [Equation 1] above, and is a horizontal resolution of the pixels PX defined between the center CEN of the display area DA and the first data line 171M electrically connected to the main crack detection line MCD1 at a side with respect to the center CEN of the display area DA. As a result, the minimum value of the matching resistors R1 and R2 is set related to the lowest horizontal resolution in the display area DA through which the first data line 171M passes. Accordingly, even when the main crack detection lines MCD1 and MCD2 are normal, the luminance of the first pixel column group PXC-M may be increased, thereby preventing misunderstanding (or misdiagnosis or misdectection) that defects, such as cracks has occurred.

As described above, when the minimum values of the matching resistors R1 and R2 are determined depending on [Equation 1], as the outermost first data line 171M approaches the center CEN of the display area DA, the matching resistors R1 and R2 may gradually increase to increase the luminance of the second pixel PX2 to which the matching resistors R1 and R2 are connected. To prevent this, approximately twice a distance D1 between the left or right outermost first data line 171M in the display area DA and the center CEN of the display area DA may be approximately equal to or greater than a length D2 of the left outermost first data line 171M in the second direction DR2 or a length D3 of the right outermost first data line 171M in the second direction DR2. Alternatively, a distance between the two first data lines 171M respectively positioned at a left outermost side and a right outermost side in the display area DA may be approximately equal to or greater than the length D2 of the left outermost first data line 171M in the second direction DR2 or the length D3 of the right outermost first data line 171M in the second direction DR2.

When the display area DA is horizontally symmetrical as illustrated in FIG. 4, the length D2 of the left outermost first data line 171M in the second direction DR2 may be substantially the same as the length D3 of the right outermost first data line 171M in the second direction DR2.

As described above, to ensure that the horizontal resolution of the display area DA through which the first data line 171M passes is equal to or greater than a minimum horizontal resolution, the distance D1 between the first data line 171M electrically connected to a first end of the main crack detection lines MCD1 and MCD2 and the center CEN of the display area DA based on the center CEN of the display area DA may be greater than the distance between the second data line 171B electrically connected to the bending crack detection line BCD at the same side and the center CEN of the display area DA. For example, the outermost first data line 171M connected to the main crack detection lines MCD1 and MCD2 positioned at a side with respect to the center CEN of the display area DA may be positioned further outside than the outermost second data line 171B connected to the bending crack detection line BCD positioned at a same side. Accordingly, a minimum horizontal resolution in the display area DA through which the first data line 171M passes is greater than a minimum horizontal resolution in the display area DA through which the second data line 171B passes.

A display device according to an embodiment will now be described with reference to FIG. 5 as well as the aforementioned drawings.

Figure 5:
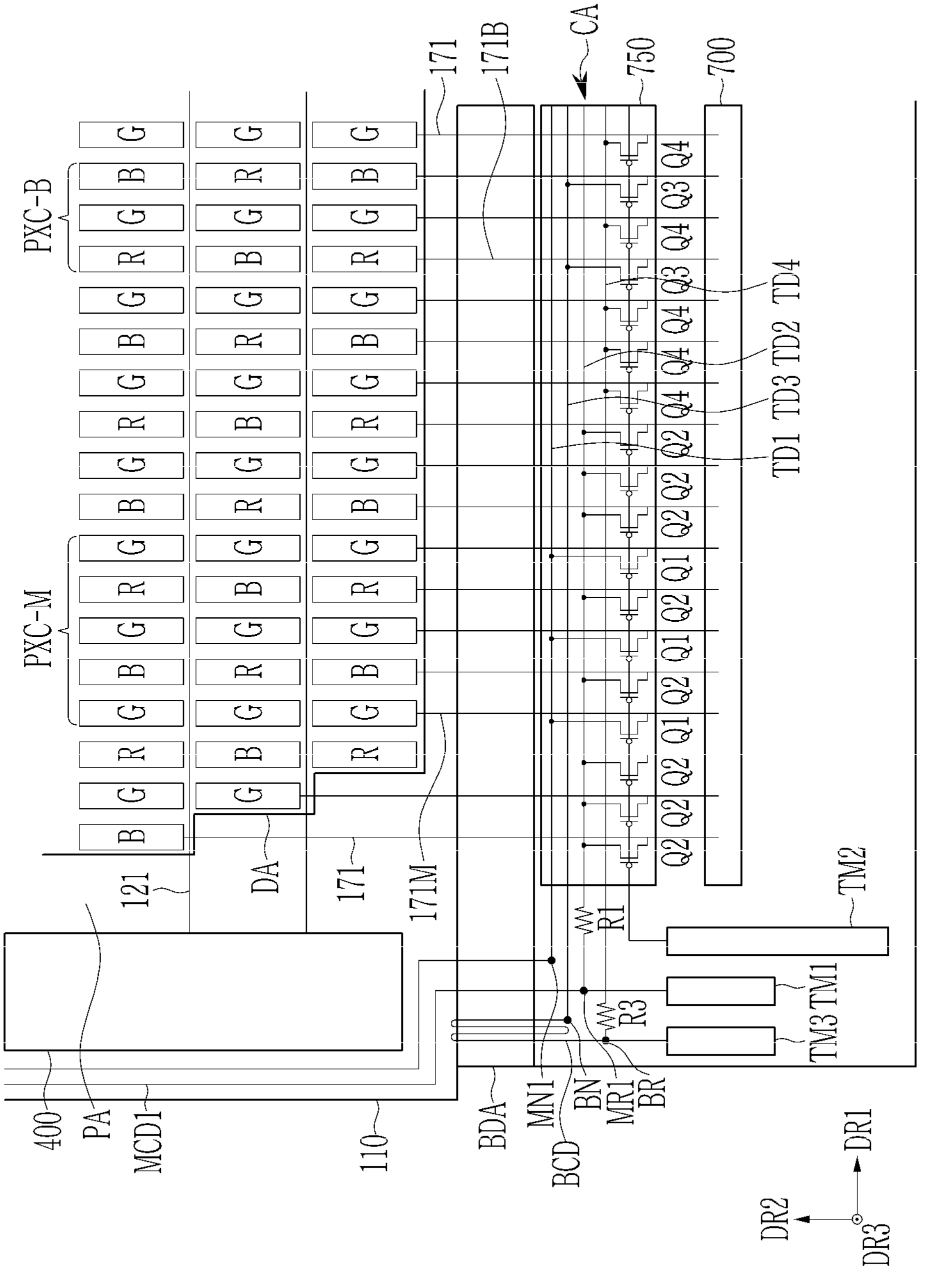
FIG. 5 is a top plan view showing some regions of a display panel according to an embodiment.

FIG. 5 illustrates a top plan view showing some regions of a display panel according to an embodiment.

Referring to FIG. 5, the display device according to the present embodiment is substantially the same as the display device described above but has the following differences.

The first pixel column group PXC-M connected to the first data line 171M connected to the main crack detection lines MCD1 and MCD2 through the first switching element Q1 may include a column of green pixels G configured to represent (e.g., emit) one color, for example, green. On the other hand, the second pixel column group PXC-B connected to the second data line 171B connected to the bending crack detection line BCD through the third switching element Q3 may include columns of the red pixel R and the blue pixel B that may display different colors from those of the first pixel column group PXC-M, such as red and blue. Accordingly, when a defect, such as a crack, occurs in the peripheral area PA, a green bright line may appear, and when a defect, such as a crack, occurs in the bending area BDA, a purple bright line may appear. Accordingly, when defects, such as cracks, are detected, whether or not a defect has occurred in the peripheral area PA at where the main crack detection lines MCD1 and MCD2 are positioned or whether or not a defect has occurred in the bending area BDA at where the bending crack detection line BCD is positioned can be distinguished and detected through a color of a line appearing in the display area DA.

According to the present embodiment, the second end BR of each bending crack detection line BCD may be connected to an inspection line TD4 through a matching resistor R3. The inspection line TD4 may primarily extend in the first direction DR1 and may be insulated from and cross the data line 171. The matching resistor R3 may act as the matching resistors R1 and R2 described above and may be determined in the same manner as the matching resistors R1 and R2.

The switching elements Q1, Q2, and Q3 of the circuit portion 750 may further include a fourth switching element Q3 having an input terminal connected to the inspection line TD4 and an output electrode connected to one or more data lines 171.

A pixel column connected to the data line 171 to which the fourth switching element Q4 is connected may be primarily positioned around the second pixel column group PXC-B connected to the second data line 171B. Accordingly, when the second pixel column group PXC-B is a pixel column including a red pixel R and a blue pixel B, the pixel column connected to the fourth switching element Q4 may be a pixel column primarily including a green pixel G.

The pixel column connected to the data line 171 connected to the second switching element Q2 connected to the matching resistor R1 may be primarily positioned around the first pixel column group PXC-M connected to the first data line 171M. Accordingly, when the first pixel column group PXC-M is the pixel column including the green pixel G, the pixel column connected to the second switching element Q2 may be a pixel column primarily including a red pixel R and a blue pixel B.

Display devices according to embodiments will described with reference to FIG. 6 and FIG. 7 as well as the aforementioned drawings.

Figure 6:
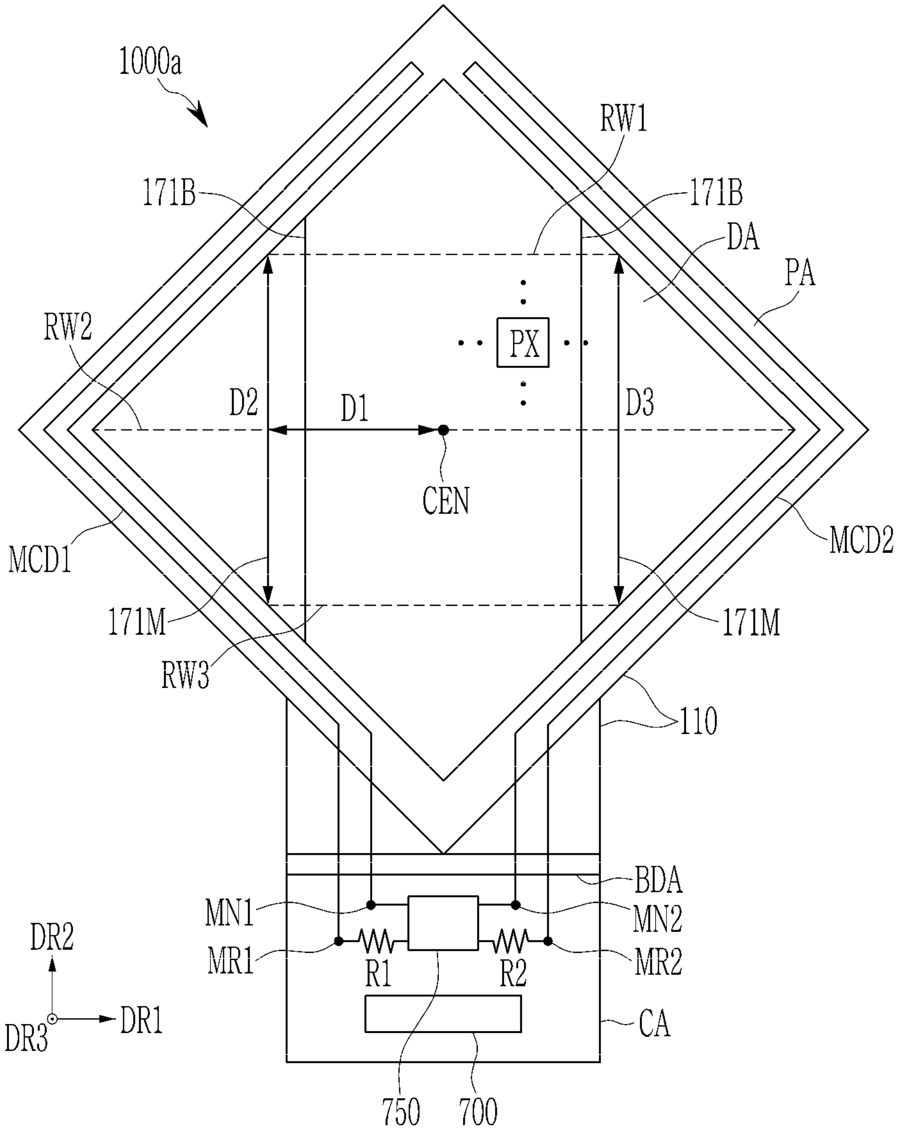
FIG. 6 and FIG. 7 are top plan views of display panels included in display devices according to embodiments.
Figure 7:
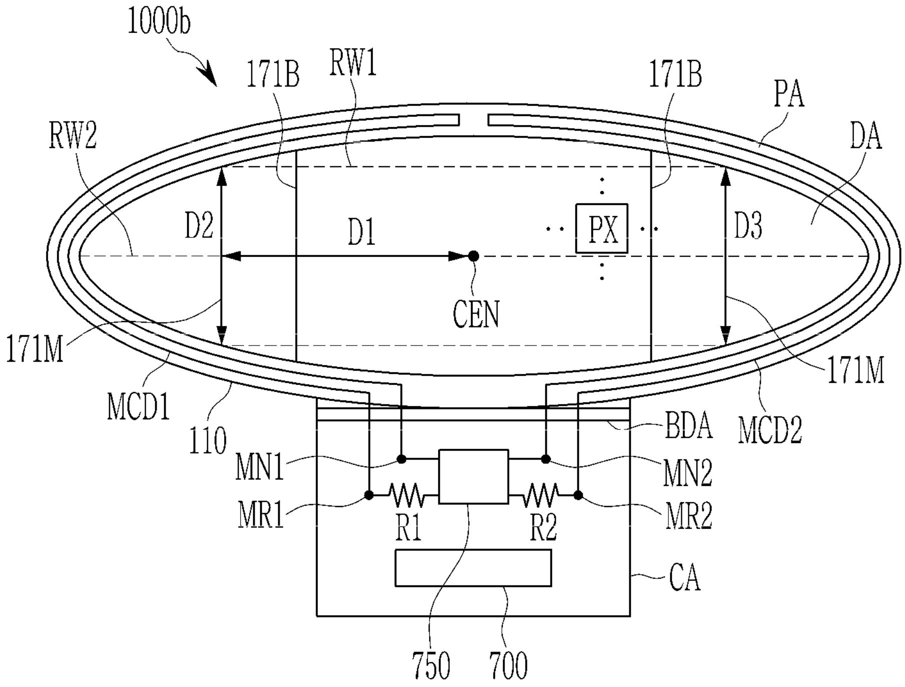

FIG. 6 and FIG. 7 each illustrate a top plan view of a display panel included in a display device according to an embodiment.

Display panels 1000*a* and 1000*b* included in the display device are substantially the same as the display panel 1000 described above, but a planar shape of the display area DA may be different from the circular shape. FIG. 6 illustrates an example in which the display area DA is substantially rectangular, more specifically, a rhombus or square, with a first diagonal line that is parallel to the first direction DR1 and a second diagonal line that is parallel to the second direction DR2. FIG. 7 illustrates an example in which the display area DA is an elliptical shape that is substantially longer in the first direction DR1. Accordingly, a horizontal resolution of the display area DA may not be constant, may be highest at a point passing through the center CEN of the display area DA, and may decrease away from the center CEN.

The distance D1 between the outermost first data line 171M electrically connected to a first end of the main crack detection lines MCD1 and MCD2 and the center CEN of the display area DA based on the center CEN of the display area DA may be greater than a distance between the outermost second data line 171B electrically connected to the bending crack detection line BCD at a same side and the center CEN of the display area DA. For example, when the main crack detection lines MCD1 and MCD2 and the bending crack detection line BCD are positioned at the left and right sides of the display area DA, respectively, a distance in the first direction DR1 between the leftmost and rightmost first data lines 171M electrically connected to both main crack detection lines MCD1 and MCD2, respectively, may be greater than a distance in the first direction DR1 between the leftmost and rightmost second data lines 171B electrically connected to both bending crack detection lines BCD, respectively. Accordingly, a minimum horizontal resolution in the display area DA through which the first data line 171M passes may be greater than a minimum horizontal resolution in the display area DA through which the second data line 171B passes.

The upper pixel row RW1 may cross (e.g., may pass through) upper ends of the left and right first data lines 171M positioned at the outermost sides with respect to the center CEN of the display area DA. The lower pixel row RW3 may pass through lower ends of the left and right first data lines 171M positioned at the outermost sides with respect to the center CEN of the display area DA. In such an embodiment, each of a length of the upper pixel row RW1 in the first direction DR1 and a length of the lower pixel row RW3 in the first direction DR1 may be approximately twice the distance D1 between the outermost first data line 171M and the center CEN of the display area DA.

Approximately twice the distance D1 between the left or right outermost first data line 171M in the display area DA and the center CEN of the display area DA may be approximately equal to or greater than the length D2 of the left outermost first data line 171M in the second direction DR2 or the length D3 of the right outermost first data line 171M in the second direction DR2. Alternatively, a distance between the two first data lines 171M respectively positioned at a left outermost side and a right outermost side in the display area DA may be approximately equal to or greater than the length D2 of the left outermost first data line 171M in the second direction DR2 or the length D3 of the right outermost first data line 171M in the second direction DR2.

The matching resistors R1 and R2 may be determined in the same manner as in the above-described embodiment.

While the present disclosure has been described in connection with what is presently considered to be practical embodiments, it is to be understood that the present disclosure is not limited to the embodiments described herein but is intended to cover various modifications and equivalent arrangements included within the spirit and scope of the appended claims and their equivalents.

DESCRIPTION OF SOME SYMBOLS

110: substrate
121: scan line
171, 171B, 171M: data line
400: scan driver
700: data driver
750: circuit portion
BCD: bending crack detection line
BDA: bending area
BN, MN1, MN2: first end
BR, MR1, MR2: second end
CA: circuit area
CEN: center of display area
DA: display area
MCD1, MCD2: main crack detection line
PA: peripheral area
PX, PX1, PX2, PX3: pixel
PXC-B: second pixel column group
PXC-M: first pixel column group
Q1, Q2, Q3, Q4: switching element
R1, R2, R3: matching resistor
RES: horizontal resolution
RW1, RW2, RW3: pixel row
TD1, TD2, TD3, TD4: inspection line
TM1, TM2, TM3: pad
1000, 1000*a*, 1000*b*: display panel

What is claimed is:

1. A display device comprising:

a display area comprising a plurality of pixels arranged to have a non-uniform horizontal resolution in a first direction;

a peripheral area extending around the display area;

a circuit area at a side of the peripheral area;

a first main crack detection line in the peripheral area and extending along a first edge of the peripheral area;

a first switching element in the circuit area and connected to a first end of the first main crack detection line;

a first data line connected to the first switching element and extending in a second direction that is different from the first direction through the display area; and a first matching resistor connected to a second end of the first main crack detection line, wherein twice a distance between the first data line and a center of the display area is equal to or greater than a length of the first data line in the second direction, and wherein a minimum value of the first matching resistor is inversely proportional to a lowest horizontal resolution of a pixel row from among pixel rows of the display area connected through the first data line.

2. The display device of claim 1, further comprising a plurality of first data lines, wherein twice a distance between an outermost one of the first data lines that is furthest from the center of the display area and the center of the display area is equal to or greater than a length of the outermost one of the first data lines in the second direction.

3. The display device of claim 1, wherein the first matching resistor is determined by the following equation, $$\frac{Rm*N}{RES}*(1+DIV)\leq R1\leq Ra$$

wherein R1 is a resistance of the first matching resistor, Rm is a resistance of the first main crack detection line, N is a number of first data lines connected to the first main crack detection line, RES is the horizontal resolution of the pixel row having the lowest horizontal resolution from among the pixel rows of the display area connected through the first data line, DIV is an allowable distribution between a voltage drop across the first main crack detection line and a voltage drop across the first matching resistor, and Ra is a maximum value of the first matching resistor.

4. The display device of claim 3, further comprising:

a second switching element in the circuit area and connected to the first matching resistor; and a second data line connected to the second switching element and extending in the second direction through the display area, wherein a maximum value of the first matching resistor is determined so that a gray displayed by a second pixel connected to the second switching element is not lower than a gray displayed by a first pixel connected to the first switching element from among the pixels when the first main crack detection line is in a normal state.

5. The display device of claim 1, further comprising:

a second main crack detection line in the peripheral area and extending along a second edge of the peripheral area facing the first edge;

a third switching element in the circuit area and connected to a first end of the second main crack detection line; and a third data line connected to the third switching element and extending in the second direction through the display area, wherein a distance between the first data line and the third data line is equal to or greater than a length of the first data line in the second direction.

6. The display device of claim 5, further comprising a plurality of first data lines and a plurality of third data lines, wherein a distance between an outermost one of the first data lines that is furthest from the center of the display area and an outermost one of the third data lines that is furthest from the center of the display area is equal to or greater than a length of the outermost one of the first data lines in the second direction.

7. The display device of claim 1, further comprising:

a bending area at a side of the peripheral area;

a bending crack detection line passing through the bending area;

a fourth switching element in the circuit area and connected to a first end of the bending crack detection line; and a fourth data line connected to the fourth switching element and extending in the second direction through the display area.

8. The display device of claim 7, wherein the first data line and the fourth data line are at a same side with respect to the center of the display area, and wherein a distance between the center of the display area and the first data line is greater than a distance between the center of the display area and the fourth data line.

9. The display device of claim 8, further comprising a plurality of first data lines and a plurality of fourth data lines, wherein a distance between an outermost one of the first data lines that is furthest from the center of the display area and the center of the display area is greater than a distance between an outermost one of the fourth data lines that is furthest from the center of the display area and the center of the display area.

10. The display device of claim 7, wherein a color indicated by a pixel connected to the first data line from among the pixels is different from a color indicated by a pixel connected to the fourth data line from among the pixels.

11. The display device of claim 1, wherein a flat shape of the display area is any one of a circle, an ellipse, and a quadrangle, and wherein, when the flat shape of the display area is the quadrangle, a diagonal of the quadrangle is parallel to the first direction or the second direction in the quadrangular display area.

12. A display device comprising:

a display area comprising a plurality of pixels arranged to have a non-uniform horizontal resolution in a first direction;

a peripheral area extending around the display area;

a circuit area at a side of the peripheral area;

a first main crack detection line in the peripheral area and extending along a first edge of the peripheral area;

a first switching element in the circuit area and connected to a first end of the first main crack detection line;

a first data line connected to the first switching element and extending in a second direction that is different from the first direction through the display area;

a first matching resistor connected to a second end of the first main crack detection line;

a second switching element in the circuit area and connected to the first matching resistor; and a second data line connected to the second switching element and extending in the second direction through the display area, wherein a minimum value of the first matching resistor is inversely proportional to a lowest horizontal resolution of a pixel row from among pixel rows of the display area connected through the first data line.

13. The display device of claim 12, wherein the first matching resistor is determined by a following equation, $$\frac{Rm*N}{RES}*(1+DIV)\leq R1\leq Ra$$

wherein R1 is a resistance of the first matching resistor, Rm is a resistance of the first main crack detection line, N is a number of first data lines connected to the first main crack detection line, RES is the horizontal resolution of the pixel row having the lowest horizontal resolution from among the pixel rows of the display area connected through the first data line, DIV is an allowable distribution between a voltage drop across the first main crack detection line and a voltage drop across the first matching resistor, and Ra is a maximum value of the first matching resistor.

14. The display device of claim 13, wherein a maximum value of the first matching resistor is not lower than a gray displayed by a first pixel connected to the first switching element from among the pixels when the first main crack detection line is in a normal state.

* * * * *